(12) United States Patent
Hommura et al.

(10) Patent No.: US 7,749,629 B2
(45) Date of Patent: Jul. 6, 2010

(54) ELECTROLYTE MEMBRANE, PROCESS FOR ITS PRODUCTION AND POLYMER ELECTROLYTE FUEL CELL

(75) Inventors: Satoru Hommura, Kanagawa (JP); Yoshiaki Higuchi, Kanagawa (JP); Hiromitsu Kusano, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 791 days.

(21) Appl. No.: 11/092,908

(22) Filed: Mar. 30, 2005

(65) Prior Publication Data

US 2005/0186461 A1    Aug. 25, 2005

Related U.S. Application Data

(63) Continuation of application No. PCT/JP03/12512, filed on Sep. 30, 2003.

(30) Foreign Application Priority Data

Sep. 30, 2002    (JP) .............................. 2002-285834

(51) Int. Cl.
| | |
|---|---|
| H01M 8/10 | (2006.01) |
| H01M 8/08 | (2006.01) |
| H01M 8/14 | (2006.01) |
| C25B 13/00 | (2006.01) |
| C25C 7/04 | (2006.01) |

(52) U.S. Cl. .............................. 429/30; 429/33; 429/46; 204/296
(58) Field of Classification Search ............... 429/33, 429/30, 46; 204/296
See application file for complete search history.

(56) References Cited

U.S. PATENT DOCUMENTS

| | | | |
|---|---|---|---|
| 5,948,557 A | * | 9/1999 | Ondeck et al. ................. 429/33 |
| 6,087,032 A | * | 7/2000 | Yoshitake et al. .............. 429/33 |
| 6,387,230 B1 | * | 5/2002 | Murphy et al. ............... 204/296 |
| 6,528,200 B1 | * | 3/2003 | Yoshitake et al. .............. 429/42 |
| 6,692,858 B2 | | 2/2004 | Higuchi et al. |

FOREIGN PATENT DOCUMENTS

| | | | |
|---|---|---|---|
| EP | 0 145 426 | * | 6/1985 |
| EP | 718903 | | 6/1996 |
| EP | 0 917 226 A2 | | 5/1999 |
| EP | 1 073 140 A1 | | 1/2001 |
| EP | 1 176 655 A1 | | 1/2002 |
| JP | 2-85387 | | 3/1990 |
| JP | 5-75835 | | 10/1993 |
| JP | 6-29032 | | 2/1994 |
| JP | 6-342667 | | 12/1994 |
| JP | 7-68377 | | 7/1995 |
| JP | 8-329962 | | 12/1996 |
| JP | 9-120827 | | 5/1997 |
| JP | 11-135137 | | 5/1999 |

* cited by examiner

*Primary Examiner*—Patrick Ryan
*Assistant Examiner*—Julian Mercado
(74) *Attorney, Agent, or Firm*—Oblon, Spivak, McClelland, Maier & Neustadt, L.L.P.

(57) ABSTRACT

An electrolyte membrane characterized by comprising a porous body formed from a melt-moldable fluororesin and having interconnected pores and an ion exchange resin with which the interconnected pores are filled, is provided. Specifically, the porous body is formed, for example, from an ethylene/tetrafluoroethylene copolymer, a tetrafluoroethylene/perfluoro(alkyl vinyl ether) copolymer, a tetrafluoroethylene/hexafluoropropylene copolymer, a tetrafluoroethylene/ $[CF_2\!=\!CF\!-\!(OCF_2CFY)_a\!-\!O_c\!-\!(CF_2)_b\!-\!SO_3H]$ copolymer (wherein Y is a fluorine atom or a trifluoromethyl group, a is an integer of 0 to 3, b is an integer of from 0 to 12, and c is 0 or 1, provided that when b=0, C=0), or the like. An electrolyte membrane reinforced by such a porous body has high mechanical strength even if it is thin, and is excellent in dimensional stability when hydrated, and a polymer electrolyte fuel cell with a membrane-electrode assembly having the electrolyte membrane provides a high output and is excellent in durability.

14 Claims, No Drawings

ELECTROLYTE MEMBRANE, PROCESS FOR ITS PRODUCTION AND POLYMER ELECTROLYTE FUEL CELL

TECHNICAL FIELD

The present invention relates to an electrolyte membrane useful for e.g. polymer electrolyte fuel cells.

BACKGROUND ART

The hydrogen-oxygen fuel cell receives attention as a power generating system having little adverse effect on the global environment because in principle, its reaction product is water only. Among such fuel cells, polymer electrolyte fuel cells are greatly expected to be used practically, since their power density has improved with the remarkable research progress in recent years.

A polymer electrolyte fuel cell has a membrane-electrode assembly which comprises gas diffusion electrodes each having a catalyst layer containing a catalyst as the anode and the cathode and an electrolyte membrane bonded to (or in contact with) the cathode and the anode flanking on both sides of the electrolyte membrane. When a fuel gas and an oxidant gas containing oxygen are supplied to the anode and the cathode of a membrane-electrode assembly, respectively, electrochemical reactions proceed inside to generate electric energy.

To improve the performance of such polymer electrolyte fuel cells, various methods for producing a membrane-electrode assembly have been studied so far, and, for example, the following methods are known.

(1) A method comprising depositing a catalyst directly on an electrolyte membrane. (2) A method comprising preparing gas diffusion electrode sheets having catalytic power and bonding the electrode sheets to an electrolyte membrane. (3) A method for producing a membrane-electrode assembly comprising preparing two electrolyte membranes (half-cells) each having a catalyst layer formed thereon and bonding the electrolyte membranes under pressure with the electrolyte membrane sides face-to-face.

Especially, the method (2) is widely used because of its advantage that small amounts of the catalysts can be used effectively. As a specific example of the method (2), a method comprising forming catalyst layers on additional base films, and transferring the catalyst layers onto an electrolyte membrane by laminating the electrolyte membrane to the catalyst layers by hot pressing (hereinafter referred to as "the transfer method") was proposed.

However, when an increase in performance of a membrane-electrode assembly is aimed by the above transfer method using an electrolyte membrane thinner than 30 μm, because such a membrane has low mechanical and tensile strengths and therefore has problematic workability and handleability, the resulting membrane-electrode assembly having such an insufficiently durable electrolyte membrane has a problem that its properties remarkably deteriorate during long operation.

Particularly, when catalyst layers are formed by coating the gas diffusion layers with a coating solution, because the gas diffusion layers are usually made of porous carbon paper or carbon felt, some carbon fibers protruding from the surfaces of the gas diffusion layers bite into the catalyst layers, and further into the electrolyte membrane at the time of bonding the electrodes and the electrolyte membrane by hot pressing, and therefore, gas leakage tends to occur. As a result, the open circuit voltage of the membrane-electrode assembly tends to drop, and the anode and the cathode tend to short-circuit. Accordingly, this method hardly provides a membrane-electrode assembly using a thin electrolyte membrane having a thickness of at most 30 μm and has limitation on how much output characteristics can be improved while maintaining good durability.

Further, attempts to increase the sulfonic acid group concentration in an electrolyte membrane have been made with a view to improving the performance of a membrane-electrode assembly by reducing the resistance of the electrolyte membrane. However, a drastic increase in the sulfonic acid group concentration in the membrane tends to deteriorate the mechanical and tensile strength of the membrane and tends to cause dimensional change due to atmospheric moisture when the membrane is handled. Further, a membrane-electrode assembly prepared by using such an electrolyte membrane vulnerable to creeping and insufficient in durability, remarkably deteriorates in terms of characteristics during long operation.

Further, an electrolyte membrane tends to cause various troubles upon hydration by swelling up in the longitudinal direction. For example, if an electrolyte fuel cell provided with a membrane-electrode assembly is operated, the membrane swells up to a larger size with water produced by the reaction or water vapor supplied together with the fuel gas. Because the membrane is usually bonded to electrodes, the electrodes also undergo dimensional change after the membrane. The assembly is usually bound to e.g. a separator having grooves formed as gas channels, and therefore, the membrane offsets its dimensional increase by wrinkling. The wrinkles can interrupt the gas flow by blocking the groove in the separator.

As a solution to the above-mentioned problems, a polytetrafluoroethylene (hereinafter referred to as PTFE) porous membrane impregnated with a fluorinated ion exchange polymer having sulfonic acid groups was proposed (e.g. JP-B-5-75835, claims 1 and 2). However, being a relatively soft material, a porous PTFE does not have sufficient reinforcing effect and falls short of a solution to the above-mentioned problems. Further, a porous polyolefin filled with an ion exchange resin was proposed (JP-B-7-68377). However, there is a problem in long-term stability with a hydrocarbon type resin because the chemical resistance is required for ion exchange membrane under operation of the fuel cell.

DISCLOSURE OF THE INVENTION

Accordingly, in order to solve the problems of the above-mentioned prior arts, the present invention provides an electrolyte membrane excellent in handleability properties, durability, output characteristics and dimensional stability when hydrated, and a stable and high power polymer electrolyte fuel cell by using the electrolyte membrane.

The present invention provides an electrolyte membrane characterized by comprising a porous body formed from a melt-moldable fluororesin and having interconnected pores filled with an ion exchange resin, and a polymer electrolyte fuel cell having a membrane-electrode assembly comprising the electrolyte membrane, and electrodes comprising catalyst layers containing a catalyst and an ion exchange resin and to be disposed on both sides of the electrolyte membrane, and gas diffusion layers to be disposed on both sides.

The present invention further provides an electrolyte membrane characterized by comprising a porous body formed from at least one member selected from the group consisting of an ethylene/tetrafluoroethylene copolymer, a tetrafluoroethylene/perfluoro(alkyl vinyl ether) copolymer, a tetrafluoroethylene/hexafluoropropylene copolymer, polychlorotrifluoroethylene, an ethylene/chlorotrifluoroethylene copolymer, polyvinylidene fluoride, polyvinyl fluoride and a tetrafluoroethylene/[$CF_2$=$CF$—($OCF_2CFY$)$_a$—$O_c$—($CF_2$)$_b$—$SO_3H$] copolymer (wherein Y is a fluorine atom or a trifluoromethyl group, a is an integer of from 0 to 3, s is an integer of from 0 to 12, and t is 0 or 1, provided that when b=0, C=0) and having interconnected pores and an ion exchange resin with which the interconnected pores are filled; and a polymer electrolyte fuel cell which has a membrane-electrode assembly comprising the electrolyte membrane and electrodes comprising catalyst layers containing a catalyst and an ion exchange resin and to be disposed on both sides of the electrolyte membrane and gas diffusion layers to be disposed on both sides.

The electrolyte membrane of the present invention is reinforced by the porous body made of a fluororesin, and therefore is excellent in handleability and durability and also is excellent in dimensional stability when hydrated. Further, the electrolyte membrane is reinforced by the porous body, and accordingly the resistance will not increase by the reinforcement, and when it is used as an electrolyte membrane for a polymer electrolyte fuel cell, a high output can be obtained and maintained for a long term. Further, the porous body is prepared by using a melt-moldable resin, and thus a simple formation method can be applied, and further, it is possible to control e.g. the porosity, mechanical strength, the output characteristics when used as an electrolyte membrane, by selecting the fluororesin.

The present invention further provides a process for producing an electrolyte membrane, which comprises mixing and kneading a melt-moldable fluororesin and an inorganic bulking agent, forming the mixture into a film, orientating the obtained film to form it into a porous body having a porosity of from 20 to 95%, and filling the porous body with an ion exchange resin.

Still further, the present invention provides a process for producing an electrolyte membrane, which comprises mixing and kneading at least one fluororesin selected from the group consisting of an ethylene/tetrafluoroethylene copolymer, a tetrafluoroethylene/perfluoro(alkyl vinyl ether) copolymer, a tetrafluoroethylene/hexafluoropropylene copolymer, polychlorotrifluoroethylene, an ethylene/chlorotrifluoroethylene copolymer, polyvinylidene fluoride and polyvinyl fluoride, with a tetrafluoroethylene/[$CF_2$=$CF$—($OCF_2CFY$)$_a$—$O_c$—($CF_2$)$_b$—$SO_2F$] copolymer (wherein Y is a fluorine atom or a trifluoromethyl group, a is an integer of from 0 to 3, b is an integer of from 0 to 12, and c is 0 or 1, provided that when b=0, c=0), forming the mixture into a film, orientating the obtained film to form it into a porous body having a porosity of from 20 to 95%, and filling the porous body with an ion exchange resin.

BEST MODE FOR CARRYING OUT THE INVENTION

In the present invention, the fluororesin constituting the porous body is a melt-moldable fluororesin, and specifically it is preferably at least one member selected from the group consisting of an ethylene/tetrafluoroethylene copolymer (hereinafter referred to as ETFE, the same applies hereinafter), a tetrafluoroethylene/perfluoro(alkyl vinyl ether) copolymer (PFA), a tetrafluoroethylene/hexafluoropropylene copolymer (FEP), polychlorotrifluoroethylene (PCTFE), an ethylene/chlorotrifluoroethylene copolymer (ECTFE), polyvinylidene fluoride (PVDF) and polyvinyl fluoride (PVF). A tetrafloroethylene/[$CF_2$=$CF$—($OCF_2CFY$)$_a$—$O_c$—($CF_2$)$_b$—$SO_2F$] copolymer (wherein Y, a, b and c are as defined above, hereinafter this copolymer will be referred to as TFE-PSVE) is also melt-moldable and is preferred. Further, a blended polymer of such polymers or another copolymer containing polymerization units constituting the above polymer may also be used.

In a case where TFE-PSVE is used, it is preferred to carry out hydrolysis and a conversion treatment into an acid form after the porous body is prepared or after a film is formed, to convert —$SO_2F$ groups into —$SO_3H$ groups (sulfonic acid groups), whereby the resistance of the porous body will decrease. Here, the tetrafluoroethylene/[$CF_2$=$CF$—($OCF_2CFY$)$_a$—$O_c$—($CF_2$)$_b$—$SO_3H$] copolymer (hereinafter referred to as TFE-PSVE-H) itself is not melt-moldable.

Among such fluororesins, particularly preferred is FEP, ETFE or PVDF, and especially preferred is ETFE which is excellent in mechanical strength and moldability. As the porous body in the present invention, a porous body formed from such a fluororesin by itself is also preferred, but a porous body obtained by blending with another melt-moldable fluororesin is also preferably used.

The ETFE has a molar ratio of polymerization units derived from tetrafluoroethylene (hereinafter referred to simply as TFE)/polymerization units derived from ethylene of preferably from 70/30 to 30/70, particularly preferably from 65/35 to 40/60. Within this range, particularly excellent mechanical strength and moldability will be obtained.

The above ETFE and PVDF may contain a small amount of polymerization units derived from a comonomer. The following may be mentioned as examples of the comonomer.

Fluoroethylenes except TFE, such as $CF_2$=$CFCl$, fluoropropylenes such as $CF_2$=$CFCF_3$ and $CF_2$=$CHCF_3$, (perfluoroalkyl) ethylenes having a $C_{4-12}$ fluoroalkyl group such as $CF_3CF_2CF_2CF_2CH$=$CH_2$ and $CF_3CF_2CF_2CF_2CF$=$CH_2$, perfluoro vinyl ethers such as $R^f(OCFXCF_2)_mOCF$=$CF_2$ (wherein $R^f$ is a $C_{1-6}$ perfluoroalkyl group, X is a fluorine atom or a trifluoromethyl group, and m is an integer of from 0 to 5), perfluoro vinyl ethers having a group which is easily converted into a carboxylic acid group or a sulfonic acid group, such as $CH_3OC$(=$O$)$CF_2CF_2CF_2OCF$=$CF_2$ and $FSO_2CF_2CF_2OCF(CF_3)CF_2OCF$=$CF_2$, olefins except ethylene, such as $C_3$ olefin such as propylene and $C_4$ olefins such as butylene and isobutylene.

When the polymerization units derived from the above comononer are contained, the proportion is usually preferably at most 30 mol %, more preferably from 0.1 to 15 mol %, furthermore preferably from 0.2 to 10 mol %, based on the total polymerization units of ETFE or PVDF. If the polymerization units derived from the above comonomer are contained in a too large amount, the fluororesin is less likely to undergo melt-molding.

Further, TFE-PSVE is particularly preferably blended with another melt-moldable fluororesin such as ETFE or PFA to form a porous body, because TEF-PSVE is easily orientated, and it is possible to form a porous body with fine pores. More specifically, the copolymer is preferably a copolymer of TFE and a compound of any of the following formulae 1 to 4. In the following formulae, d is an integer of from 1 to 9, e is an integer of from 1 to 8, f is an integer of from 0 to 8, and g is 2 or 3.

$CF_2=CFO(CF_2)_dSO_2F$            Formula 1

$CF_2=CFOCF_2CF(CF_3)O(CF_2)_eSO_2F$            Formula 2

$CF_2=CF(CF_2)_fSO_2F$            Formula 3

$CF_2=CF[OCF_2CF(CF_3)]_gO(CF_2)_2SO_2F$            Formula 4

The porous body of the present invention may be prepared by various methods. For example, a phase transfer method, a micropore forming material extraction method, an orientation method and an electron beam/etching method may, for example, be mentioned, and an orientation method is particularly preferred. Specifically, a method of blending an inorganic bulking agent with the above fluororesin as mentioned hereinafter to obtain a film as a raw fabric and orientating the film (method 1) or a method of melt-blending TFE-PSVE with at least one other melt-moldable fluororesin to obtain a film as a raw fabric, and orientating the film (method 2) is preferred.

In the method 1, the inorganic bulking agent may be any known one and is not particularly limited so long as interfacial peeling between it and the blended fluororein takes place during orientation and many fine voids are formed. It may, for example, be anhydrous silica, talc, clay, kaoline, mica, zeolite, calcium carbonate, barium carbonate, magnesium carbonate, calcium sulfate, barium sulfate, magnesium sulfate, zinc oxide, calcium oxide, magnesium oxide, titanium oxide, aluminum hydroxide, magnesium hydroxide or pottasium phosphate. Among them, anhydrous silica is particularly preferred.

The particle size of the inorganic bulking agent is preferably from 0.005 to 30 µm, particularly preferably from 0.01 to 20 µm, especially preferably from 0.015 to 10 µm, so as to form favourable fine pores.

Further, the amount of the inorganic bulking agent is selected within a range to secure the desired porosity and not to impair stretchability and moldability, and it is usually preferably from 90/10 to 40/60, particularly preferably from about 85/15 to about 50/50, as the mass ratio of fluororesin/inorganic bulking agent. The surface of particles of such an inorganic bulking agent may be treated with a proper surface treating agent such as a coupling agent in accordance with a known method so as to improve dispersibility into the fluororesin.

In the method 1, the fluororesin and the inorganic bulking agent are charged and mixed in a proper powder mixer such as a V-type mixer, a double conical mixer, a ribbon type mixer, a miner axis rotor type mixer, a turbine type mixer, a Henschel mixer, a high speed mixer, a supermixer or a tumbler mixer, and then the mixture is kneaded and pelletized by using a single screw or double screw extruder (mixing/kneading step). Otherwise, the fluororesin and the inorganic bulking agent are not preliminarily mixed but they are charged into a single screw or double screw extruder from independent feeders in constant amounts and kneaded while being mixed in the extruder.

Then, the obtained pellets are melted and formed into a film by an extruder equipped with a flat die or a T-die at a temperature of at least the melting point of the fluororesin as a constituting material, preferably at a temperature higher than the melting point by at least 20° C., and at a temperature lower than the decomposition temperature, to obtain an inorganic bulking agent-containing fluororesin film (hereinafter referred to as "raw fabric film") (molding step). Here, the thickness of the raw fabric film is usually from 3 to 1,000 µm, preferably from 5 to 500 µm, more preferably from about 10 to about 250 µm.

Then, the raw fabric film is orientated under specific conditions as described hereinafter (orientation step) to obtain a porous film as the porous body made of a fluororesin of the present invention.

In the method 2, it is required for the fluororesins to be melt-blended that they can be melted, kneaded and mixed at a temperature of at most the decomposition temperatures, the fluororesins to be blended are incompatible with each other and undergo phase separation, interfacial peeling or fibrillation takes place between the polymers which underwent phase separation during orientaion, and many fine voids or pores can be formed. In such a viewpoint, in the method 2 in the present invention, TFE-PSVE and at least one fluororesin selected from the group consisting of ETFE, PFA, FEP, PCTFE, ECTFE, PVDF and PVF are melt-blended.

TFE-PSVE is contained in an amount of preferably from 10 to 90%, more preferably from 30 to 70%, to the total mass of the melt-blended polymers. A porous body having a sufficient porosity is hardly obtained if the amount of TFE-PSVE to the total mass of the polymers is too large or too small.

Further, TFE-PSVE is preferably one having an ion exchange capacity when the SO₂F groups are hydrolyzed and converted into an acid form, of preferably from 0.5 to 2.0 meq/g dry resin, particularly preferably from 0.7 to 1.6 meq/g dry resin. If the ion exchange capacity is too small, the stretchability tends to be poor, and if the ion exchange capacity is too large, the mechanical strength tends to be low.

In the method 2 also, a porous body can be prepared by means of a mixing/kneading step, a molding step and an orientation step in the same manner as in the method 1. Specifically, at least one flruororesin selected from the group consisting of ETFE, PFA, FEP, PCTFE, ECTFE, PVDF and PVF and TFE-PSVE are mixed in a mixer in the same manner as in the method 1, and then kneaded and pelletized in the same manner as in the method 1. Then, the pellets are melted and formed into a film in the same manner as in the method 1 at a temperature of at least the melting point of TFE-PSVE and the other fluororesin as the constituting materials to obtain a melt-blended film (hereinafter referred to as "raw fabric film" in the same manner as the inorganic bulking agent-containing fluororesin film). Then, the orientation step as mentioned hereinafter is carried out in the same manner as in the method 1 to obtain a porous film as a porous body.

The obtained porous film may be used as it is, but is preferably converted into TFE-PSVE-H by hydrolysis and a conversion treatment into an acid form. By these treatments, the resistance of the porous film itself decreases, and thus the resistance of the electrolyte membrane obtained by filing with an ion exchange resin will decrease. The hydrolysis and the conversion treatment into an acid form may be carried out after a film is formed after completion of the molding step and before the orientation step is carried out. In the method 1 also, when TFE-PSVE is used, it is preferred to carry out the hydrolysis and the conversion treatment into an acid form after a porous film is obtained or before the orientation step is carried out.

In the molding step, it is preferred to carry out melting and film formation by using an extruder in the same manner as in the method 1. However, the melt-blended polymers exhibit a phase separation state, and when they are extruded and formed into a film, the polymers may be aligned in the extrusion direction, and the obtained film may have high anisotropy in e.g. mechanical strength. Thus, it is preferred that two molded films are overlaid so that their extrusion directions are at right angles with each other and laminated by using e.g. a roll pressing machine, and the laminate is subjected to an orientation treatment to obtain the porous body of the present invention, whereby the strength in the longitudinal direction and in the transverse direction will be equal, such being favorable.

Now, the orientation step in common with the methods 1 and 2 will be explained below.

One example of the orientation step as a model mainly comprises a first step of forming a laminate of the raw fabric film and an assist film, a second step of orientating the laminate and a third step of removing the assist film e.g. by peeling after the orientation.

Firstly, the first step will be explained below.

The first step is a step of laminating an assist film which assists the raw fabric film to be orientated on at least one side, preferably on both sides of the raw fabric film to form a raw fabric film/assist film laminate (hereinafter referred to as "raw fabric film laminate"). By laminating the assist film, the melt-moldable fluororesin film such as ETFE which is usually hardly orientated, even in a state where it contains an inorganic bulking agent such as anhydrous silica, or in a state where it is melt-blended with another fluororesin, can be smoothly orientated. This is the point to form the raw fabric film into a porous body.

In the above laminate, the assist film is not necessarily strongly bonded or heat-sealed on the raw fabric film but the assist film is only required to be overlaid on the raw fabric film with a certain level of interfacial adhesive force (or interfacial shear strength). When the assist film forming the outer surface is orientated while being held by e.g. rolls, guide rails or clips of an orientation apparatus in the following orientation step, it is only required that the assist film and the raw fabric film will not slide at the interface and independently move, and that the raw fabric film forcibly follows the orientation of the assist film.

The raw fabric film laminate may be prepared by various methods. For example, (1) a heat lamination method wherein an assist film is overlaid preferably on both sides of a separately prepared raw fabric film and contact bonded by heating by means of a hot pressing machine or by passing them through heat rolls. (2) A coextrusion lamination method wherein an inorganic bulking agent-containing fluororesin, or a blended polymer comprising at least two melt-moldable fluororesins obtained by the kneading/mixing step, and a resin constituting the assist film, are melted in a multilayer die and extruded as a laminated film. (3) An extrusion lamination method wherein a raw fabric film is preliminarily prepared, and on the film, a resin forming the assist film is extruded in the form of a film by an extruder.

In the method (2), the fluororesin and the assist film may be laminated in the die or outside the die. When they are laminated in the die, the die structure may be single manifold or multimanifold. Further, in the method (3), in the case where the films are contact bonded by heating by e.g. hot pressing, a proper adhesive such as a hot melt adhesive may be interposed between the two films to adjust the adhesive force.

Usually, when a laminated film is formed by the above method, the surface of the films as base materials is preliminarily subjected to a surface treatment such as a corona discharge treatment so as to increase the adhesive force between layers. However, usually such a pretreatment is not required for the raw fabric film laminate of the present invention since the assist film is preferably easily pealed after the orientation.

In the present invention, the resin constituting the assist film is preferably a resin which can easily undergo single orientation (such as single biaxial orientation) by itself basically and which has a melting point or a glass transition point lower than that of the raw fabric film. Specifically, it may, for example, be polyethylene terephthalate (PET), polyethylene (PE), polypropylene (PP), polycarbonate (PC), nylon 6 (PA6), nylon 66 (PA66), polystyrene (PS), poly(α-methylstyrene) (PαMS), polyacrylonitrile (PAN), polyvinyl chloride (PVC), polyvinyl acetate (PVAC), polybutene (PB), polyethylene chloride (CPE), an ethylene vinyl chloride copolymer (EVC), an ethylene vinyl acetate copolymer (EVA), polymethyl methacrylate (PMMA) or polyvinyl alcohol (PVAL). Among them, PET, PE, PP, PC or PA6 is preferred. The assist film to be used is preferably a non-oriented film, and the thickness of the assist film is preferably from 50 to 2,000 μm.

Now, the second step will be explained. The second step is an orientation step of orientating the raw fabric film laminate formed in the first step. The orientation step mainly comprises steps of preheating to the orientation temperature of the raw fabric film laminate, orientating and heat setting (stabilizing) by heat treatment.

The raw fabric film laminate is firstly preheated to the orientation temperature. The orientation temperature is usually a proper temperature of at least the glass transition points and at most the melting points of the raw fabric film and the resin constituting the assist film, and it is preferably at most 250° C., particularly preferably from 0 to 200° C., furthermore preferably from 50 to 200° C., especially preferably from 60 to 160° C. For example, when an ETFE film is used as the raw fabric film and a PET film is used as the assist film, the temperature is preferably from about 80 to about 120° C. The preheating may be carried out by contacting the raw fabric film laminate with a heat roll, by hot air or by irradiation with an infrared heater, etc. The orientation is preferably biaxial orientation, preferably simultaneous biaxial orientation or sequential biaxial orientation, and most preferably simultaneous biaxial orientation.

The simultaneous biaxial orientation is to carry out longitudinal orientation (orientation in the direction of movement (MD direction) of the film) and the transverse orientation (orientation in a direction at right angles to the MD direction (TD direction)) simultaneously. Usually, while moving the raw fabric film laminate by guide rails, the distance between the guide rails are widened by a tenter disposed in a predetermined shape to carry out the transverse orientation and simultaneously, the longitudinal orientation is carried out by pantagraph mechanism clips with which the distance in the longitudinal direction increases.

On the other hand, the sequential biaxial orientation is usually to carry out the longitudinal orientation first and then to carry out the transverse orientation. As a typical means of the longitudinal orientation, orientation rolls are used, a low speed rotating roll is disposed on the upstream side and a high speed rotating roll is disposed on the downstream side, and the preheated raw fabric film laminate is passed through these rolls, whereby a tension is applied in the direction of movement of the raw fabric film laminate utilizing the difference in circumferential speed between these rolls, so that the laminate is orientated in the longitudinal direction. Then, in the transverse orientation, basically the film laminate is orientated in the transverse direction by the above-described tenter.

The draw ratio may vary depending upon the thickness and type of the raw fabric film and the assist film, the thickness and porosity of the aimed porous films, and the content of the inorganic bulking agent in the case of the method 1 or the mixture ratio of at least two polymers in the case of the method 2, etc. However, it is usually from 2 to 15 times in the longitudinal direction and from 2 to 15 times in the transverse direction, preferably it is a level of from 2 to 6 times in the longitudinal direction and from 2 to 6 times in the transverse direction.

The raw fabric film laminate thus orientated may be cooled as it is, or may be subjected to a heat treatment at a temperature higher than the orientation temperature to release the remaining stress, so as to improve the dimensional stability. The heat treatment temperature is usually preferably within a range of from a temperature of at most the melting point of the fluororesin constituting the raw fabric film to the orientation temperature, more preferably within a range of from a temperature lower by about 10° C. than the melting point to a temperature higher by 20° C. than the orientation temperature. Further, the heat treatment time is preferably from about 0.1 to about 60 minutes. For example, in the case of an ETFE film, it is preferred to carry out a heat treatment at from 250 to 140° C. for from 0.2 to 10 minutes.

Finally, in the third step, the assist film is mechanically peeled off from the raw fabric and removed to obtain a porous body.

In a case where the assist film can not easily be peeled off from the fluororesin film, the assist film may be dissolved with a solvent and removed.

In the case of the method 1, in the porous body obtained by the above method, basically particles of the inorganic bulking agent used as a fiber disintegrating agent remain. Usually the porous body may be used as it is for various applications, however, the inorganic bulking agent may be removed from the porous body to further improve the porosity. For example, the porous body may be treated with a solvent capable of dissolving the inorganic bulking agent. For example, in a case where the inorganic bulking agent is anhydrous silica, the porous body is immersed in hydrofluoric acid, whereby silica will easily be dissolved and removed.

In either case of the methods 1 and 2, the obtained porous body is required to have interconnected pores, because in the membrane obtained by filling with an ion exchange resin, paths in which proton is conducted can not be secured if the ion exchange resin forms no continuous phase. When the porous body is prepared by the above method, it can be made to have interconnected pores. Further, the porosity of the porous body is preferably from 20 to 95%. If it is less than 20%, the proton conductivity may be inhibited and the resistance of the electrolyte membrane may be high, and if it exceeds 95%, it tends to be difficult to maintain strength as a reinforcing material. It is more preferably from 40 to 90%.

The thickness of the porous body is preferably from 1 to 50 μm, more preferably from 1 to 20 μm. Further, the average pore size of the porous body is preferably from 0.01 to 5 μm, particularly preferably from about 0.05 to about 1 μm. If the pore size is too small, it tends to be difficult to impregnate the porous body with the ion exchange resin in the following step. Further, if the pore size is too large, the reinforcing effect tends to be low.

In the present invention, the method of filling the porous body with the ion exchange resin is not particularly limited, and for example, a method wherein a liquid having the ion exchange resin dispersed or dissolved in a dispersion medium (solvent) (hereinafter referred to as an ion exchange resin-containing coating liquid) is preliminarily coated on a substrate and then immediately the porous body is immersed in and impregnated with the coating liquid, followed by drying, may be mentioned. Further, a method wherein the ion exchange resin-containing coating liquid is coated on the porous body preliminarily disposed on a substrate so that the porous body is impregnated with the coating liquid, followed by drying, may also be mentioned. In either case, the substrate is peeled off from the porous body after filled with the ion exchange resin. Further, a method wherein the porous body is passed through and impregnated with the ion exchange resin-containing coating liquid, followed by drying, may also be mentioned.

The ion exchange resin of the present invention is preferably a cation exchange resin made of a perfluorocarbon polymer having sulfonic acid groups, and the cation exchange resin may be a cation exchange resin made of a hydrocarbon polymer or a partially fluorinated hydrocarbon polymer. The cation exchange membrane may be a single ion exchange resin or a mixture of at least two ion exchange resins.

As the perfluorocarbon polymer having sulfonic acid groups, a variety of known polymers may be used. Especially, it is preferably a copolymer of a perfluorovinyl compound represented by the formula $CF_2=CF(OCF_2CFX)_m-O_p-(CF_2)_n SO_3H$ (wherein X is a fluorine atom or a trifluoromethyl group, m is an integer of from 0 to 3, n is an integer of from 0 to 12, and p is 0 or 1, provided that when n=0, p=0) with a perfluoroolefin, a perfluoroalkyl vinyl ether or the like. Specific examples of the perfluorovinyl compound are compounds represented by the following formulae 5 to 8. In the following formulae, q is an integer of from 0 to 9, r is an integer of from 1 to 8, s is an integer of from 0 to 8, and z is 2 or 3.

Formula 5

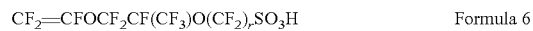

Formula 6

Formula 7

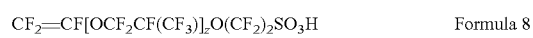

Formula 8

The polymer comprising polymerization units derived from a perfluorovinyl compound having a sulfonic acid group is usually obtained by polymerization of a perfluorovinyl compound having a —$SO_2F$ group and then converting the —$SO_2F$ groups into —$SO_3H$ groups. The perfluorovinyl compound having a —$SO_2F$ group is usually copolymerized with a comonomer such as a perfluoroolefin or a perfluoro (alkyl vinyl ether) because it is unlikely to undergo radical polymerization, though it may be polymerized alone. As the perfluoroolefin used as a comonomer, for example, tetrafluoroethylene, hexafluoropropylene or the like may be mentioned. Usually, the use of tetrafluoroethylene is preferred.

The perfluoro(alkyl vinyl ether) as a comonomer is preferably a compound represented by $CF_2=CF-(OCF_2CFY)_t-O-R^f$ wherein Y is a fluorine atom or a trifluoromethyl group, t is an integer of from 0 to 3, and $R^f$ is a linear or branched perfluoroalkyl group represented by $C_uF_{2u+1}$ ($1 \leq u \leq 12$), more specifically, compounds represented by the formulae 9 to 11. In the following formulae, v is an integer of from 1 to 8, w is an integer of from 1 to 8, and x is 2 or 3.

Formula 9

Formula 10

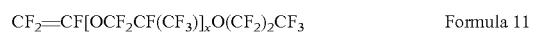

Formula 11

In addition to a perfluoroolefin or a perfluoro(alkyl vinyl ether), other fluorine-containing monomers such as 1,1,2,3,3,4,4-heptafluoro-4-[(trifluoroethenyl)oxy]-1-butene may be copolymerized with the perfluorovinyl compound having a —$SO_2F$ group as a comonomer.

As an ion exchange resin which is a polymer other than the perfluorocarbon polymer, which may be contained in the electrolyte membrane, a polymer comprising polymerization units represented by the formula 12 and polymerization units represented by the formula 13 may, for example, be mentioned. Here, $p^1$ is a phenyltriyl group, a biphenyltriyl group, a naphthalenetriyl group, a phenanthrenetriyl group or an anthracenetriyl group, $P^2$ is a phenylene group, a biphenylene group, a naphthylene group, a phenanthrylene group or an anthracylene group, $A^1$ is a —$SO_3M$ group (wherein M is a hydrogen atom or an alkali metal atom, hereinafter the same applies), a —COOM group or a group hydrolysable thereto, and each of $B^1$ and $B^2$ which are independent of each other, is an oxygen atom, a sulfur atom, a sulfonyl group or an isopropylidene group, provided that the structural isomerism of $P^1$ and $P^2$ is not particularly restricted, and at least one hydrogen atom in each of $P^1$ and $P^2$ may be substituted by a fluorine atom, a chlorine atom, a bromine atom or an alkyl group having from 1 to 3 carbon atoms.

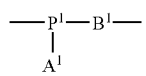

Formula 12

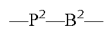

Formula 13

In the present invention, the ion exchange capacity of the ion exchange resin is preferably from 0.5 to 2.0 meq/g dry resin, particularly preferably from 0.7 to 1.6 meq/g dry resin. If the ion exchange capacity is too low, the resistance tends to be large, while if the ion exchange capacity is too high, the affinity for water tends to be so strong that the electrolyte membrane may dissolve during power generation.

The electrolyte membrane obtained by the present invention is excellent in mechanical strength and has small dimensional change when hydrated, and is therefore excellent in handleability when the membrane is handled. Particularly, the membrane undergoes substantially no dimensional change due to atmospheric moisture when the membrane is handled, and thus it is easily handled. Further, when a cell is operated using the electrolyte membrane of the present invention, swelling of the electrolyte membrane due to e.g. water produced by the reaction or water vapor supplied together with the fuel gas can be suppressed, and thus the gas flow in the separator will not be interrupted. Further, the membrane provides a high stability even for a further long-term operation.

The polymer electrolyte fuel cell of the present invention comprises a membrane comprising the above porous body filled with an ion exchange resin as an electrolyte membrane, catalyst layers containing a catalyst and an ion exchange resin provided on both sides of the electrolyte membrane, and gas diffusion layers made of e.g. carbon cloth or carbon paper disposed preferably on both outside surfaces. It may be obtained, in accordance with a conventional method, as follows for example. First, an electroconductive carbon black powder carrying platinum or platinum alloy catalyst particles and a solution of a perfluorocarbon polymer having sulfonic acid groups are mixed to obtain a uniform dispersion, and gas diffusion electrodes are formed by either of the following methods to obtain a membrane-electrode assembly. As the membrane, an ion exchange membrane comprising the porous body filled with an ion exchange resin is used.

A first method comprises applying the dispersion on both sides of the ion exchange membrane, drying the dispersion and then bonding two carbon cloths or carbon papers onto both sides of the membrane. A second method comprises applying the dispersion on two carbon cloths or carbon papers, drying the dispersion, and then interposing the ion exchange membrane between the carbon cloths or carbon papers so that the faces on which the dispersion is coated adhere to the ion exchange membrane. The carbon cloths or carbon papers function not only as gas diffusion layers to secure uniform gas diffusion throughout the layers containing a catalyst but also as current collectors.

The resulting membrane-electrode assembly is interposed between separators having grooves as channels for a fuel gas or an oxidant gas, and then assembled in a cell to obtain a polymer electrolyte fuel cell. The separators may, for example, be electroconductive carbon plates.

In the polymer electrolyte fuel cell obtained as mentioned above, hydrogen gas is supplied to the anode, and oxygen or air is supplied to the cathode. On the anode, the reaction represented by $H_2 \rightarrow 2H^+ + 2e^-$ proceeds, and on the cathode, the reaction represented by $\frac{1}{2}O_2 + 2H^+ + 2e^- \rightarrow H_2O$ proceeds to convert chemical energy into electric energy.

Now, the present invention will be described in detail with reference to Examples. However, it should be understood that the present invention is by no means restricted thereto.

EXAMPLE 1 FOR PREPARATION OF POROUS BODY

An ethylene/tertafluoroethylene/C4 olefin terpolymer having a melt index value (MI) of 3.8 at 300° C. (trade name: AFLON COPC-88AX, manufactured by Asahi Glass Company, Limited) and anhydrous silica (trade name: AEROSIL OX50, manufactured by NIPPON AEROSIL CO., LTD., average particle size of primary particles: 40 nm) as an inorganic bulking agent in a mass ratio of 85:15 were thoroughly mixed by a powder mixing machine.

The mixture was kneaded by a twin screw extruder (TEM-35 manufactured by TOSHIBA MACHINE CO., LTD.) at 300° C., and then a strand with a diameter of 2.5 mm was extruded and cut into a length of 2.5 mm to obtain pellets.

The pellets were supplied to a single-screw extruder having a bore diameter of 40 mm (VS40, manufactured by IKEGAI Corporation) and extruded at a die temperature of 333° C. at an extrusion rate of 4.3 kg/hr through a flat die having a die width of 700 mm. The resulting extruded product was drawn down along a roll the surface temperature of which was adjusted at 130° C. at a rate of 0.59 m/min to obtain an anhydrous silica-containing ETFE film having a thickness of 109 μm.

(2) The obtained film (hereinafter referred to as ETFE raw fabric film) was subjected to biaxial orientation in accordance with the following process to obtain a porous body. Namely, first, the ETFE raw fabric film was sandwiched between two non-oriented polyester films (A-PET FR-1, manufactured by TEIJIN LIMITED) of 210 μm as assist films to obtain a three-layered film. Then, by using a pair of a metal roll and a roll covered with a robber with a thickness of 10 mm, after the surface temperature was adjusted at 85° C., the three-layered film was pressurized under a linear pressure of 40 kg/cm as calculated as the width of the film, and laminated at a rate of 10 cm/min to obtain a three-layer laminated film. This film was cut into a 90 mm square to obtain a sample for orientation.

The sample of the three-layer laminated film was subjected to simultaneous biaxial orientation by using a biaxial orientation testing apparatus (biaxial orientation testing apparatus manufactured by Toyo Seiki Seisaku-sho, Ltd.) at a temperature of 95° C. with preheating of 3 minutes at an orientation rate of 2 m/min so that the dimension of the sample would be 2.2 times as large as the dimension of the sample before orientation in longitudinal and transverse directions to obtain a biaxially oriented film. The obtained film was air-cooled under tension until the surface temperature became at most 40° C. and then taken out.

Then, after the assist films were peeled off, the film was treated with hydrofluoric acid so that anhydrous silica was dissolved and removed to obtain an ETFE porous body having a thickness of 21 μm. The porous body was observed by a scanning microscope and as a result, it was confirmed that its surface was spongy and it was formed into a porous body with countless fine pores.

(3) With respect to the ETFE porous body sample, the following measurements were carried out.

(Elastic Modulus in Tension (Unit Width, Unit Mass))

Based on JIS K7127, the above sample was cut into a strip sample with a width of 10 mm and a length of 150 mm, which was pulled with a distance between bench marks of 50 mm with a distance between chucks of 100 mm at a test rate of 50 mm/min, and the elastic modulus in tension was obtained from the slope of the initial 10% distortion in a chart of the obtained displacement and the load. The measured elastic modulus in tension was divided by the width (cm) and the basis weight (g/m$^2$) of the strip sample, to calculate the elastic modulus per unite width and per unit mass of the porous body. The measurement was carried out with respect to five samples, and the average was obtained.

Based on JIS P8117, by using a Gurley densometer, the time 100 cc of the air took to pass through was measured as the gas transmission (Gurley value), and presence or absence of interconnected pores was judged. The measurement was carried out with respect to five samples, and the average was obtained.

[Porosity]

The volume and the mass of the porous body were measured, and the porosity was calculated by using the following formula.

{(Volume of porous body)−(mass of porous body)/
(true specific gravity of polymer forming porous
body)}/(volume of porous body)×100(%)

The results of the respective measurements are shown in Table 1.

EXAMPLE 2 FOR PREPARATION OF POROUS BODY

A porous body was obtained in the same manner as in Example 1 except that the draw ratio was 3.0 times in longitudinal and transverse directions. The evaluation was carried out in the same manner as in Example 1. The results are shown in Table 1.

EXAMPLE 3 FOR PREPARATION OF POROUS BODY 20 g of polyvinylidene fluoride is added to 180 g of a dimethylformamide solvent, followed by stirring at 80° C. for 16 hours to dissolve the vinylidene polyfluoride, and the obtained solution is cast-coated on a glass plate by using a bar coater to obtain a membrane with a thickness of 50 μm. Then, the membrane is immediately immersed in water as a poor solvent for 15 minutes so that vinylidene polyfluoride is deposited, whereby the membrane is formed into a porous body. Then, four sides of the porous body are fixed and the porous body is dried in an oven of 120° C. for 16 hours, whereby a porous body of polyvinylidene fluoride is obtained. The evaluation is carried out in the same manner as in Example 1 with respect to this porous body, whereby results as shown in Table 1 is obtained.

EXAMPLE 4 FOR PREPARATION OF POROUS BODY (COMPARATIVE EXAMPLE)

By using a commercially available PTFE porous body (trade name: Poreflon FP-010, manufactured by SUMITOMO ELECTRIC FINE POLYMER INC.) which is a typical porous body of a fluororesin, the evaluation was carried out in the same manner as in Example 1. The results are shown in Table 1.

EXAMPLE 5 FOR PREPARATION OF POROUS BODY (EXAMPLE OF THE PRESENT INVENTION)

A powder of a copolymer comprising polymerization units derived from tetrafluoroethylene and polymerization units derived from $CF_2=CF-OCF_2CF(CF_3)O(CF_2)_2SO_2F$ (ion exchange capacity when hydrolyzed and converted into an acid form: 1.1 meq/g dry resin, hereinafter referred to as resin A) and FEP (melt index at 372° C.: 7) in a mass ratio of 50:50 (volume ratio of 52:48) were thoroughly mixed by a powder mixing machine. The mixture was kneaded by a double-screw extruder (trade name: PCM30, manufactured by IKEGAI Corporation) at 300° C. and then a strand with a diameter of 2.5 mm was extruded, which was cut into a length of 2.5 mm to obtain pellets. These pellets were supplied to a single-screw extruder (VS30 manufactured by TANABE PLASTICS) with an aperture of 30 mm and extruded by using a flat die having a die width of 350 mm at a die temperature of 300° C. at an extrusion amount of 1.3 kg/hr. The obtained extruded product was drawn down along a roll the surface temperature of which was adjusted at from 30 to 50° C. at a rate of 1.71 m/min to obtain a blended film with a thickness of 20 μm.

Then, with respect to a pair of a metal roll and a roll covered with robber with a thickness of 10 mm, the metal roll temperature was adjusted at 200° C. and the robber-covered roll temperature was adjusted at 135° C. By using these rolls, two blended films were overlaid so that the extrusion directions (hereinafter referred to as MD) were at right angles with each other and passed through the rolls and laminated at a rate of 0.4 m/min, while pressurizing the films under a linear pressure of 40 kg/cm as calculated as the film width.

The obtained film (hereinafter referred to as laminated blended raw fabric film) was subjected to biaxial orientation in accordance with the following method to obtain a porous body. Namely, the laminated blended raw fabric film was sandwiched between two non-oriented polyester films of 210 μm (trade name: A-PET FR-1 manufactured by TEIJIN LIMITED) as assist films to obtain a tree-layered film. Then, using a pair of a metal roll and a roll covered with robber with a thickness of 10 mm, after the surface temperature was adjusted at 85° C., the three-layered film was pressurized under a linear pressure of 40 kg/cm as calculated as the width of the film and laminated at a rate of 10 cm/min to obtain a three-layer laminated film. This was cut into a 90 mm square to obtain a sample for orientation. This sample was subjected to simultaneous biaxial orientation by using a biaxial orientation testing apparatus (biaxial orientation testing apparatus manufactured by Toyo Seiki Seisaku-Sho, Ltd.) at a temperature of 95° C. with preheating for 3 minutes at an orientation rate of 2 m/min so that the dimension of the sample would be 2.5 times as large as the dimension of the sample before orientation in longitudinal and transverse directions to obtain a biaxially oriented film.

The obtained film was air-cooled under tension until the surface temperature became at most 40° C. and then taken out, and then the assist films were peeled off to obtain a polymer blended porous body with a thickness of 12 μm. Then, the porous body was hydrolyzed and subjected to a conversion treatment into an acid form so that the —$SO_2F$ groups were converted into —$SO_3H$ groups. The porous body was observed by a scanning microscope and as a result, the porous body was confirmed to be formed into a porous structure in a fibrous structure in which fine cracks were formed at the interface of the polymers which underwent phase separation, and the cracks were bound by countless fibrils.

With respect to this porous body, the elastic modulus in tension and the porosity were measured in the same manner as in the Example 1, whereupon the results as shown in Table 1 were obtained. Further, when the gas transmission is measured in the same manner as in Example 1, whereupon the result as shown in Table 1 is obtained.

EXAMPLE 6 FOR PREPARATION OF POROUS BODY (EXAMPLE OF THE PRESENT INVENTION)

Films were obtained and laminated, and a laminated blended film with a thickness of 40 μm was obtained in the same manner as in Example 5 except that the resin A and ETFE (Fluon ETFE, LM-730AP, registered trade mark of Asahi Glass Company, Limited) were mixed in a mass ratio of 55:45 (volume ratio of 52:48). The obtained laminated blended raw fabric film was subjected to biaxial orientation in the same manner as in Example 5 to obtain a porous body with a thickness of 15 μm.

With respect to this porous body, the elastic modulus in tension and the porosity were measured in the same manner as in Example 1, whereupon the results as shown in Table 1 were obtained. Further, the gas transmission is measured in the same manner as in Example 1, whereupon the result as shown in Table 1 is obtained.

EXAMPLE 7 FOR PREPARATION OF POROUS BODY (COMPARATIVE EXAMPLE)

Films were obtained and a membrane with a thickness of 40 μm was obtained in the same manner as in Example 5 except that PFE (trade name: Fluon PFA, P-62XP, manufactured by Asahi Glass Company, Limited) and ETFE (trade name: Fluon ETFE, manufactured by Asahi Glass Company, Limited) were used in a mass ratio of 50:50 (volume ratio of 55:45), the kneading temperature and the temperature for formation of a film were 360° C. The obtained blended raw fabric film was subjected to biaxial orientation in the same manner as in Example 5, however, the film was broken at the interfacial peeling potion between polymers, and no continuous porous film was obtained.

TABLE 1

| | Elastic modulus in tension ($N \cdot cm^{-1} \cdot g^{-1} \cdot m^2$) | Gas transmission (sec) | Porosity (%) | Thickness (μm) |
|---|---|---|---|---|
| Ex. 1 | 101 | 8 | 65 | 41 |
| Ex. 2 | 92 | 6 | 72 | 23 |
| Ex. 3 | 80 | 5 | 80 | 22 |
| Ex. 4 | 11 | 6 | 61 | 20 |
| Ex. 5 | 50 | 5 | 40 | 12 |
| Ex. 6 | 55 | 5 | 35 | 15 |

EXAMPLE 1

(Preparation of Electrolyte Membrane)

A liquid mixture (solid content of 9 mass%) of a powder of a copolymer comprising polymerization units derived from tetrafluoroethylene and polymerized units derived from $CF_2$=CF—$OCF_2CF(CF_3)O(CF_2)_2SO_3H$ (ion exchange capacity: 1.1 meq/g dry resin, hereinafter referred to as resin B) and ethanol was coated on a PET film the surface of which was treated with a silicone releasant by die coating. Then, the porous body obtained in Preparation Example 1 was immediately overlaid on the coated layer so that the porous body was impregnated with the liquid, followed by drying in an oven of 80° C. for 10 minutes, and then a heat treatment was further carried out in an oven of 120° C. for 30 minutes to obtain an electrolyte membrane with a thickness of 50 μm.

(Measurement of Tear Strength)

A 100 mm×100 mm square sample for measurement of tear strength was prepared from the above electrolyte membrane. The sample was cut over 50 mm, i.e. from one edge to the center with a knife, and the resulting legs were spread about vertically from the crotch. The end of each leg was fixed to the upper or lower chuck of a tensile tester, and the sample was torn at a rate of 500 mm/min. The tear strength was calculated by dividing the tearing load by the thickness of the electrolyte membrane (the average of the tear strength in longitudinal and transverse directions). The results are shown in Table 2.

(Measurement of Dimensional Change Upon Hydration)

A 200 mm square sample was cut from the above electrolyte membrane and left standing for 16 hours at a temperature of 25° C. in an atmosphere having a 50% humidity, and then the longitudinal and transverse dimensions of the sample were measured. Then, the sample was immersed in deionized water of 25° C. for 1 hour, and the dimensions were measured similarly. The dimensional change was calculated from the elongation of the sample (the average of the longitudinal elongation and transverse elongation).

(Measurement of Membrane Resistance)

A 5 mm-wide strip sample was cut from the above electrolyte membrane and maintained in a thermohygrostat at a temperature of 80° C. and a relative humidity of 95% with 5 platinum wires (diameters: 0.2 mm) placed on it transversely in parallel at 5 mm intervals, and the AC impedance between platinum wires was measured under an alternating current with a frequency of 10 kHz to obtain the specific AC resistance. As the five platinum wires placed at 5 mm intervals afforded variety to the cathode-anode distance, the AC resistance was measured at cathode/anode distances of 5, 10, 15 and 20 mm. The specific resistance of the membrane was calculated from the slope of the plot of the cathode/anode distance vs. the resistance so as to exclude the influence of the contact resistance between the platinum wires and the membrane. The cathode/anode distance and the measured resistance showed a linear reaction, and the effective resistance was calculated from the slope of the plot of them and the thickness.

(Preparation and Evaluation of Fuel Cell)

A fuel cell can be assembled as follows. The resin B and a platinum-loaded carbon (mass ratio of platinum:carbon is 55:45) are mixed in a mass ratio of 1:3 and mixed with ethanol to prepare a coating solution. The coating solution is coated on both sides of an electrolyte membrane by die coating and dried to form 10-μm thick electrode layers having a platinum content of 0.5 mg/cm² on both sides of the membrane. Further, carbon cloths are put as gas diffusion layers on both sides to obtain a membrane-electrode assembly. Further, carbon plates having narrow zigzag grooves as gas channels cut by machining are put on both sides as separators, and then heaters are put onto the outer surfaces to assemble a polymer electrolyte fuel cell having an effective membrane surface area of 25 cm$^2$.

Cell voltages at current densities of 0.1 A/cm$^2$ and 1 A/cm$^2$, when the temperature of the fuel cell is maintained at 80° C., and the air is supplied to the cathode and hydrogen is supplied to the anode, whereupon the results as shown in Table 2 are obtained.

EXAMPLE 2

An electrolyte membrane with a thickness of 30 μm was obtained in the same manner as in Example 1 except that the porous body obtained in Preparation Example 2 was used. With respect to this electrolyte membrane, the evaluation was carried out in the same manner as in Example 1. The results are shown in Table 2. Further, by using this electrolyte membrane, a fuel cell is assembled in the same manner as in Example 1 and evaluation is carried out in the same manner as in Example 1, whereupon the results as shown in Table 2 are obtained.

EXAMPLE 3

An electrolyte membrane with a thickness of 30 μm is obtained by carrying out the same treatment as in Example 1 except that the porous body obtained in Preparation Example 3 is used. With respect to this electrolyte membrane, the evaluation is carried out in the same manner as in Example 1, whereupon the results as shown in Table 2 are obtained. Further, by using this electrolyte membrane, a fuel cell is assembled in the same manner as in Example 1 and the evaluation is carried out in the same manner as in Example 1, whereupon the results as shown in Table 2 are obtained.

EXAMPLE 4 (COMPARATIVE EXAMPLE)

An electrolyte membrane with a thickness 30 of μm was obtained in the same manner as in Example 1 except that the porous body obtained in preparation Example 4 was used. With respect to this electrolyte membrane, the evaluation was carried out in the same manner as in Example 1. The results are shown in Table 2. Further, by using this electrolyte membrane, a fuel cell is assembled in the same manner as in the Example 1 and evaluation is carried out in the same manner as in Example 1, whereupon the results as shown in Table 2 are obtained.

EXAMPLE 5

An electrolyte membrane with a thickness of 45 μm was obtained in the same manner as in Example 1 except that the porous body obtained in Preparation Example 5 was used. With respect to this electrolyte membrane, the dimensional change and the membrane resistance were measured in the same manner as in Example 1. The results are shown in Table 2. With respect to this electrolyte membrane, the tear strength is measured in the same manner as in Example 1, whereupon the result as shown in Table 2 is obtained. Further, by using this electrolyte membrane, a fuel cell is assembled in the same manner as in Example 1 and the evaluation is carried out in the same manner as in Example 1, whereupon the results as shown in Table 2 are obtained.

EXAMPLE 6

An electrolyte membrane with a thickness of 45 μm was obtained in the same manner as in Example 1 except that the porous body obtained in the Preparation Example 6 was used. With respect to the electrolyte membrane, the dimensional change and the membrane resistance were measured in the same manner as in Example 1. The results are shown in Table 2. With respect to the electrolyte membrane, the tear strength is measured in the same manner as in Example 1, whereupon the result as shown in Table 2 is obtained. Further, by using this electrolyte membrane, a fuel cell is assembled in the same manners in Example 1 and the evaluation is carried out in the same manner as in Example 1, whereupon the results as shown in Table 2 are obtained.

TABLE 2

| | Tear strength (N/mm) | Dimensional change upon hydration (%) | Membrane resistance (Ω·cm) | Membrane thickness (μm) | Cell voltage | |
| --- | --- | --- | --- | --- | --- | --- |
| | | | | | 0.1 A/cm$^2$ | 1 A/cm$^2$ |
| Ex. 1 | 17 | 2.5 | 7 | 50 | 0.70 | 0.50 |
| Ex. 2 | 15 | 3.0 | 6 | 30 | 0.73 | 0.62 |
| Ex. 3 | 13 | 1.2 | 5 | 30 | 0.73 | 0.65 |
| Ex. 4 | 10 | 6.5 | 7 | 30 | 0.72 | 0.58 |
| Ex. 5 | 30 | 3.0 | 8 | 45 | 0.71 | 0.60 |
| Ex. 6 | 25 | 3.0 | 9 | 45 | 0.70 | 0.57 |

INDUSTRIAL APPLICABILITY

According to the present invention, a mechanically strong, though thin, electrolyte membrane showing excellent dimensional stability when hydrated can be obtained. A membrane-electrode assembly having the obtained electrolyte membrane is excellent in handleability and stability, and a polymer electrolyte fuel cell having the membrane-electrode assembly provides a high output and is excellent in durability.

The entire disclosure of Japanese Patent Application No. 2002-285834 filed on Sep. 30, 2002 including specification, claims and summary is incorporated herein by reference in its entirety.

What is claimed is:

1. An electrolyte membrane comprising a porous body formed from an ethylene/tetrafluoroethylene copolymer and having interconnected pores and an ion exchange resin with which the interconnected pores are filled.

2. The electrolyte membrane according to claim 1, wherein the ion exchange resin is made of a perfluorocarbon polymer having sulfonic acid groups.

3. The electrolyte membrane according to claim 2, wherein the perfluorocarbon polymer is a copolymer comprising polymerization units derived from tetrafluoroethylene and polymerization units derived from $CF_2=CF-(OCF_2CFX)_m-O_p-(CF_2)_n-SO_3H$ (wherein X is a fluorine atom or a trifluoromethyl group, m is an integer of from 0 to 3, n is an integer of from 0 to 12, and p is 0 or 1, provided that when n=0, p=0).

4. The electrolyte membrane according to claim 1, wherein the ion exchange resin is a cation exchange resin.

5. The electrolyte membrane according to claim 1, wherein the ion exchange resin is a cation exchange resin made of a hydrocarbon polymer or a partially fluorinated hydrocarbon polymer.

6. The electrolyte membrane according to claim 1, wherein the ion exchange resin is a cation exchange resin and is a polymer obtained from a perfluorovinyl compound having sulfonic acid groups and a perfluorinated comonomer.

7. The electrolyte membrane according to claim 6, wherein the perfluorinated comonomer is a perfluoroolefin or a perfluoro(alkyl vinyl ether).

8. The electrolyte membrane according to claim 7, wherein the perfluoroolefin is tetrafluoroethylene or hexafluoropropylene.

9. A process for producing an electrolyte membrane, which comprises mixing and kneading an ethylene/tetrafluoroethylene copolymer and an inorganic bulking agent, forming the mixture into a film, orientating the obtained film to form it into a porous body having a porosity of from 20 to 95%, and filling the porous body with an ion exchange resin.

10. The process for producing an electrolyte membrane according to claim 9, wherein the film is orientated by laminating an assist film thereon.

11. A process for producing an electrolyte membrane, which comprises mixing and kneading an ethylene/tetrafluoroethylene copolymer with a tetrafluoroethylene/ $[CF_2=CF—(OCF_2CFY)_a—O_c—(CF_2)_b—SO_2F]$ copolymer (wherein Y is a fluorine atom or a trifluoromethyl group, a is an integer of from 0 to 3, b is an integer of from 0 to 12, and c is 0 or 1, provided that when b=0, C=0), forming the mixture into a film, orientating the obtained film to form it into a porous body having a porosity of from 20 to 95%, and filling the porous body with an ion exchange resin.

12. The process for producing an electrolyte membrane according to claim 11, wherein the film is orientated by laminating an assist film thereon.

13. The process for producing an electrolyte membrane according to claim 11, wherein after the porous body is prepared by orientation, or after the film is formed and before it is orientated, hydrolysis and a conversion treatment into an acid form are carried out.

14. A polymer electrolyte fuel cell, which has a membrane-electrode assembly comprising an electrolyte membrane comprising a porous body formed from an ethylene/tetrafluoroethylene copolymer and having interconnected pores and an ion exchange resin with which the interconnected pores are filled, and electrodes comprising catalyst layers containing a catalyst and an ion exchange resin and to be disposed on both sides of the electrolyte membrane, and gas diffusion layers to be disposed on both sides.

* * * * *